July 6, 1926.

R. MILLS 1,591,396

WEED EXTRACTOR

Filed Nov. 21, 1923

INVENTOR
RUSSELL MILLS.

July 6, 1926.

R. MILLS

WEED EXTRACTOR

Filed Nov. 21, 1923

INVENTOR
RUSSELL MILLS.

BY *Featherstonhaugh*
ATTYS.

Patented July 6, 1926.

1,591,396

UNITED STATES PATENT OFFICE.

RUSSELL MILLS, OF MAJORVILLE, ALBERTA, CANADA.

WEED EXTRACTOR.

Application filed November 21, 1923. Serial No. 676,085.

This invention relates to improvements in weed extractors and more particularly to machines of this kind of the rotary type.

The objects of the invention are to provide a rotary weed extracting machine of light and durable construction and in which the weeds are removed from the ground by means of rotating wires.

Further objects of the invention are the provision of a weeding machine of this character that will more efficiently perform the work required of it and in which the extractors, being rotatable above and below the ground, are, in operation, automatically kept clear of weeds and thus prevented from being clogged.

With the foregoing and other objects in view, the invention consists essentially in the novel arrangement and construction of parts described in the present specification and illustrated by the accompanying drawings that form part of the same.

Referring now to the drawings, in which like characters of reference indicate corresponding parts in each figure.

Figure 4 is an end view of the same.

Figure 1:
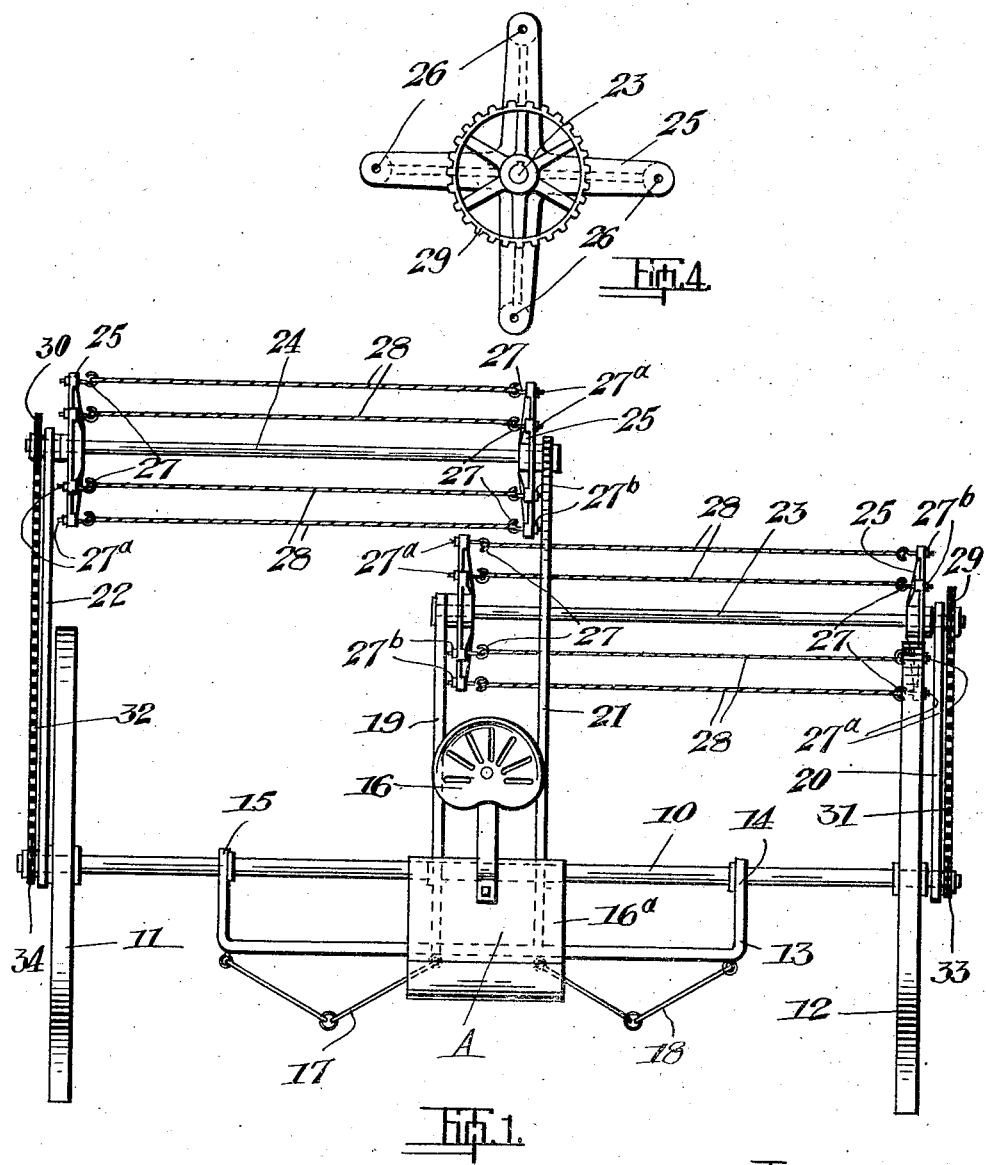
Figure 1 is a top plan view of an embodiment of my device.
Figure 2:
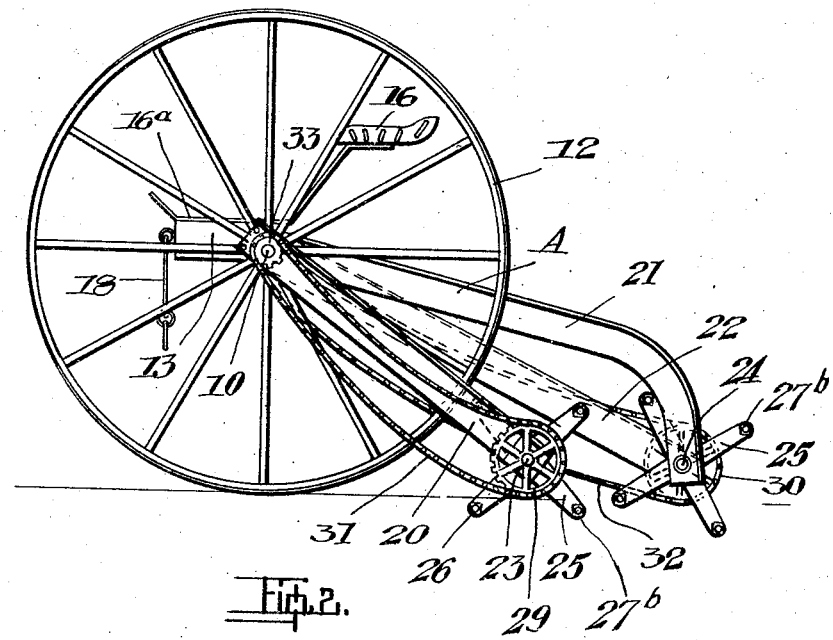
Figure 2 is a side elevation.
Figure 3:
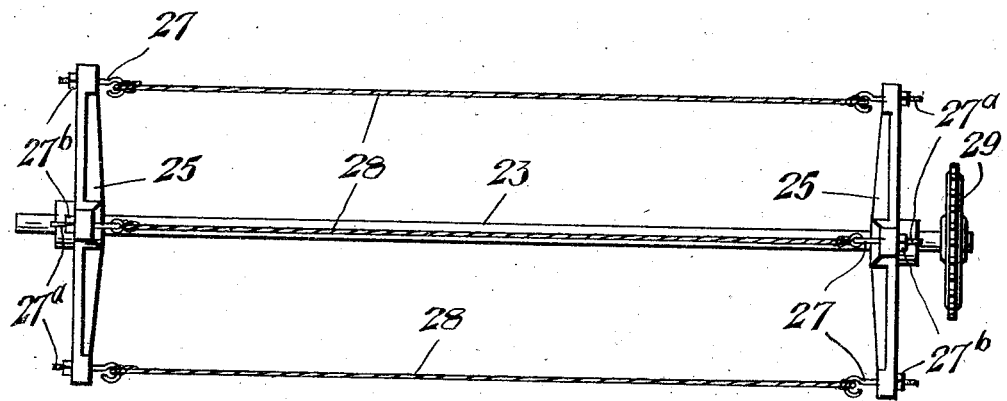
Figure 3 is a plan view of the rotatable weed extracting means.

In the drawings, A designates an embodiment of my improved rotary weeding machine as a whole comprising a transversely extending shaft 10 having keyed at each end thereon tractor wheels 11 and 12 and adapted to carry intermediate of said wheels a supporting bracket 13 provided with arms 14 and 15 adapted to loosely engage with the shaft 10. On this bracket 13 is mounted a driver's seat 16 and a platform 16$^a$, while link-connected to the front of it are hounds 17 and 18 whereby horses can be attached to draw the machine.

The weed extractors carried by the machine are attached in the rear of and substantially on each side of the driver's seat and are also so arranged that the one in front slightly overlaps the one further in the rear, thus forming an unbroken line of extraction between the wheels.

These weed extractors comprise the supporting arms 19 and 20 and 21 and 22, respectively, the forward ends of the arms 19 and 21 being supported on the bracket 13 and the forward ends of the arms 20 and 22 being loosely mounted on the shaft 10. The outer extremities of these arms are designed to carry the rotatable shafts 23 and 24, respectively, these shafts having keyed thereon star-shaped castings 25 at each end provided with suitable apertures therein 26 adapted to engage with hook members 27.

It will be noted that these hook members are threaded on the inner ends at 27$^a$ so that they can be passed through the openings 26 and then fitted with retaining nuts 27$^b$, thus providing means for tightening or loosening the wires 28 and also making it comparatively easy for a wire, when broken, to be renewed.

The numeral 28 indicates wires of suitable formation and strength strung on these hook members 27 and designed, when rotated, to eradicate the weeds from the ground.

To rotate the castings 25, sprocket wheels 29 and 30 are provided on the shafts 23 and 24 and these sprocket wheels are in turn connected by chains 31 and 32 to sprocket wheels 33 and 34 on the shaft 10.

In operation, it will be seen that on the machine being moved forward and the axle 10 rotated the sprocket wheels 33 and 34 will rotate, operating, through the chains 31 and 32 and the sprockets 29 and 30, the shafts 23 and 24 with the wire-connected castings 25 thereon to engage with the earth and the wires being preferably barbed to efficiently extract the weeds therefrom.

A feature of my improved weeder is the prevention of clogging of the extractors, this being accomplished by the fact that they are adapted to rotate above the ground as well as under it, thereby, in their rotation above the ground, automatically clearing themselves of any accumulation of weeds encountered in their travel beneath the ground.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

A weed extractor comprising a shaft, means for rotating the shaft, a star-shaped casting, having a plurality of threaded orifices in the points thereof, rigidly mounted at each end of the shaft, hook members formed with threaded stems adapted to engage with said orifice, retaining, adjusting nuts for the hook members and strands of wire or the like rigidly connected at each end to said hook members and weed eradicating means formed on said wires.

In witness whereof I have hereunto set my hand.

RUSSELL MILLS.